United States Patent
Swami

(10) Patent No.: US 7,177,272 B2
(45) Date of Patent: Feb. 13, 2007

(54) SYSTEM AND METHOD FOR OPTIMIZING LINK THROUGHPUT IN RESPONSE TO NON-CONGESTION-RELATED PACKET LOSS

(75) Inventor: Yogesh Swami, Irving, TX (US)

(73) Assignee: Nokia Corporation, Espoo (FI)

( * ) Notice: Subject to any disclaimer, the term of this patent is extended or adjusted under 35 U.S.C. 154(b) by 49 days.

(21) Appl. No.: 10/603,593

(22) Filed: Jun. 25, 2003

(65) Prior Publication Data

US 2004/0264366 A1    Dec. 30, 2004

(51) Int. Cl.
*H04J 1/16* (2006.01)
*H04J 12/26* (2006.01)
*G01R 31/08* (2006.01)
*G06F 11/00* (2006.01)
*G08C 15/00* (2006.01)

(52) U.S. Cl. ........................ 370/229; 370/230

(58) Field of Classification Search ........ 370/229–237, 370/385–396, 474, 338, 352, 465, 401, 328; 455/427; 709/224–235, 238; 714/752, 776, 714/748, 704, 708, 749, 750; 725/110, 143

See application file for complete search history.

(56) References Cited

U.S. PATENT DOCUMENTS

| | | | | |
|---|---|---|---|---|
| 5,912,878 | A | * | 6/1999 | Park et al. ................. 370/229 |
| 5,974,028 | A | * | 10/1999 | Ramakrishnan ............. 370/229 |
| 6,178,448 | B1 | * | 1/2001 | Gray et al. ................ 709/224 |
| 6,370,144 | B1 | * | 4/2002 | Chao et al. ............ 370/395.42 |
| 6,711,128 | B1 | * | 3/2004 | Ramakrishnan ............. 370/230 |
| 2003/0035420 | A1 | * | 2/2003 | Niu .......................... 370/389 |

OTHER PUBLICATIONS

Balakrishnan, H. et al; A Comparison of Mechanisms for Improving TCP Performance Wireless Links, Dec. 6, 1997; IEEE/ACM Transactions on, vol. 5, Issue: 6, pp. 756-769.*

Wenqing Ding; Jamalipour, A.; Delay performance of the new explicit loss notification TCP technique for wireless networks, Nov. 25, 2001, Global Telecommunications Conference, 2001. GLOBECOM '01. IEEE, vol. 6, pp. 3483-3487.*

Samaraweera, N.K.G; Non-Congestion Packet Loss Detection for TCP Error Recovery Using Wireless Links, Aug. 1999, Communications, IEEE Proceedings, vol. 146, Issue: 4, pp. 222-230.*

(Continued)

*Primary Examiner*—Chi Pham
*Assistant Examiner*—Prenell Jones
(74) *Attorney, Agent, or Firm*—Hollingsworth & Funk, LLC

(57) ABSTRACT

A system, apparatus, and method for providing secure loss recovery for packet loss due to bit errors and other non-congestion-related packet loss occurring over the communication link. An intermediary node in a network between a sending node and a receiving node identifies packet loss due to bit errors (PLB), or other non-congestion-based packet loss, over a network connection between the sending module and the network node. A loss notification signal is sent from the network node to the sending module in response to identification of the non-congestion-based packet loss. The PLB is verified at the sending module. A first loss recovery procedure is performed, different from a second loss recovery procedure associated with congestion-based packet loss, if the PLB is verified at the sending module.

33 Claims, 8 Drawing Sheets

OTHER PUBLICATIONS

Rajesh Krishnan, Mark Allman, Craig Partridge, and James P.G. Sterbenz, "Explicit Transport Error Notification (ETEN) for Error-Prone Wireless and Satellite Networks—Summary," *Earth Science Technology Conference—2002*, Pasadena, CA, USA, Jun. 11-13, 2002.

M. Allman, V. PAxson, and W. Stevens, "TCP Congestion Control," IETF RFC 2581, Apr. 1999.

* cited by examiner

SYSTEM AND METHOD FOR OPTIMIZING LINK THROUGHPUT IN RESPONSE TO NON-CONGESTION-RELATED PACKET LOSS

FIELD OF THE INVENTION

This invention relates in general to communications, and more particularly to a system, apparatus, and method for providing secure loss recovery for packet loss due to bit errors and other non-congestion-related packet loss occurring over the communication link.

BACKGROUND OF THE INVENTION

Advances in communication infrastructures and protocols have turned standard computing devices into valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, current and anticipated mobile phone technologies have transformed these wireless devices into powerful communication tools capable of communicating voice, data, images, video, and other multimedia content. PDAs, once the portable calendaring and organizational tool, now often include network communication capabilities such as e-mail, Internet access, etc. With the integration of wireless and landline network infrastructures, a multitude of information types can be conveniently communicated between wireless and/or landline terminals.

A primary enabler for such communications is the advancement and integration of networking technologies. In order to facilitate open platforms and interoperability, data communications models have been established. A well-known Interconnect (OSI) reference model. The standard OSI reference model, also referred to as the protocol stack, includes various layers that define the functions of communications protocols. Each layer of the model represents a function that is to be performed when data is between peer applications across a network(s). Within a functional layer, any number of protocols may be used to provide a suitable service to the function of that layer. Generally, the protocols of a layer communicate with peers of an analogous protocol in that layer on a remote system or device. There are also rules defining how the information is passed between layers within the stack.

One layer of the protocol stack is the transport layer. One function of this layer is to guarantee that the receiving device receives data just as it was sent. Some transport layer protocols are considered "connectionless," in that there is no handshaking to "establish" a virtual connection between sending and receiving devices. The User Datagram Protocol (UDP) is an example of one such connectionless transport layer protocol. However, other transport layer protocols provide a reliable, connection-oriented, byte-stream communication. These protocols will retransmit data for lost or damaged segments, and also establish logical end-to-end connections between the communicating hosts using handshaking techniques. One well-known connection-oriented transfer layer protocol is the Transmission Control Protocol (TCP). TCP is the most common transfer layer protocol used in Internet data transmissions. TCP provides reliability by retransmitting data unless it receives an acknowledgment from the receiving device that the data successfully arrived at the receiving device. TCP and other such reliable transport layer protocols therefore accommodate packet loss situations, and perform recovery from such loss.

Conceptually, packets are lost in the network primarily due to two reasons; packet loss due to network congestion (PLC) or packet loss due to bit errors (PLB). PLC occurs when a router or other network element expends its physical memory and can no longer queue packets to schedule for departure. PLB occurs due to the physical properties of the channel itself.

TCP assumes that all losses are caused by buffer overflow only, and it thus reacts by reducing its share of buffer usage in the network to half of its previous usage. More particularly, one congestion response methodology utilized by TCP is a "slow start" (SS) congestion response methodology that is used to control the amount of outstanding data being introduced into the network. This congestion control methodology uses various parameters, including a congestion window and a slow start threshold. The congestion window is a state variable that refers to the sender-side limit of the quantity of data that the sender can transmit into the network before receiving an acknowledgement. The slow start threshold is used to determine whether a slow start or congestion avoidance algorithm should be used to control data transmission. Using these parameters, segments can slowly be introduced to the network, where the congestion window grows until it reaches the slow start threshold, at which time it may grow at a different rate. When congestion is detected (e.g., when a retransmission timeout occurs and/or duplicate acknowledge packets are received), the slow start threshold is set to half of the current congestion window, and the congestion window is then reset to one Maximum Segment Size (MSS).

Such a methodology is performed to prevent further loss of packets. However, with PLB, reducing the resource usage does not prevent any further loss. This is because the loss was caused by, for example, the physical properties of the channel rather than due to a lack of resources. This unnecessarily impedes the throughput of the system. TCP and other transport layer protocols have traditionally protected only against congestion loss, rather than bit errors, because wireline networks experience very small PLB. However, the PLB problem becomes much more prevalent in the case of wireless communication, where the wireless communication link is more susceptible to bit errors.

Accordingly, there is a need in the communications industry for a manner of providing appropriate loss recovery for packet loss not caused by network congestion, such as PLB. A further need exists for a system and methodology that provides a secure manner of notifying sending nodes of PLB and other non-congestion-based packet loss, to prevent against untrustworthy intermediary nodes in the network. The present invention fulfills these and other needs, and offers other advantages over the prior art packet loss recovery approaches.

SUMMARY OF THE INVENTION

To overcome limitations in the prior art described above, and to overcome other limitations that will become apparent upon reading and understanding the present specification, the present invention discloses a system, apparatus and method for providing secure loss recovery for packet loss due to bit errors and other non-congestion-related packet loss occurring over the communication link.

In accordance with one embodiment of the invention, a method is provided for increasing throughput over network connections experiencing data loss due to non-congestion-based packet loss. A network node identifies non-congestion-based packet loss over a network connection between a sending module and the network node. A loss notification signal is sent from the network node to the sending module in response to identification of the non-congestion-based packet loss. The non-congestion-based packet loss is verified at the sending module, and if the non-congestion-based packet loss is verified at the sending module, a first loss recovery procedure is performed. The first loss recovery procedure is different from a second loss recovery procedure associated with congestion-based packet loss.

According to more particular embodiments of such a method, the non-congestion-related packet loss involves packet loss due to bit errors (PLB). In another particular embodiment, sending the loss notification involves embedding data associated with the packet experiencing packet loss into a signaling protocol packet, and sending the signaling protocol packet as the loss notification to the sending module. More particularly, sending the signaling protocol packet to the sending module may further involve embedding the signaling protocol packet into the payload of a network layer packet, and sending the signaling protocol packet to the sending module via the network layer packet. In one particular embodiment, verifying the non-congestion-based packet loss involves forwarding the signaling protocol packet from a network layer of the sending module to a signaling protocol layer of the sending module, identifying a transport layer protocol in a next header field within the data embedded in the signaling protocol packet, informing the identified transport layer protocol of the non-congestion-based packet loss, and verifying the non-congestion-based packet loss via the identified transport layer protocol. In yet a more particular embodiment, verifying the non-congestion-based packet loss via the identified transport layer protocol involves marking the packet experiencing non-congestion-based packet loss to indicate that the loss notification signal was received from the network node for the packet, and enabling the performance of the first loss recovery procedure in response to receipt of a predetermined number of duplicate acknowledge packets from the network node for the marked packet. In another particular embodiment, embedding data associated with the packet experiencing non-congestion-based packet loss involves copying as many bytes from the packet experiencing non-congestion-based packet loss as can fit into the signaling protocol packet within the network layer packet.

Other particular embodiments of such a method include verifying the non-congestion-based packet loss at the sending module by marking the packet experiencing non-congestion-based packet loss to indicate that the loss notification signal was received from the network node for the packet, and enabling the performance of the first loss recovery procedure in response to receipt of a predetermined number of duplicate acknowledge packets from the network node for the marked packet. In one embodiment, normal communication may be continued at the sending module during the time required to receive the predetermined number of duplicate acknowledge packets. In another particular embodiment of the method, performing the first loss recovery procedure involves sending the packet experiencing packet loss, setting a slow start threshold equal to a number of packets in flight, incrementing a congestion window for each duplicate acknowledge received until the packet experiencing packet loss is acknowledged, and setting the congestion window equal to the slow start threshold when the packet experiencing packet loss is acknowledged. The second loss recovery procedure is a standard congestion response procedure in one particular embodiment of the invention. Further, in one embodiment, identifying non-congestion-related packet loss involves distinguishing between congestion-related packet loss and non-congestion-related packet loss over the network connection. For example, non-congestion-related packet loss may be identified by identifying bit errors associated with a packet transmitted to the network node using checksum information provided to the network node via the packet.

In accordance with another embodiment of the invention, a communication device is provided for communicating information over a network. The communication device includes a receiver for receiving indications of packet loss due to bit errors (PLB) pertaining to packets previously transmitted by the communication device. A packet marking module is coupled to receive the PLB indications and to mark the respective previously-transmitted packets as potentially subject to PLB. A verification module receives a packet loss indication, and can receive packet marking status from the packet marking module to determine whether the packet loss indication corresponds to any of the previously-transmitted packets that have been marked. A non-congestion-based loss recovery module is coupled to the verification module to perform packet loss recovery, without requiring reduction of a congestion window, for the previously-transmitted packets that are both associated with the packet loss indication and have been marked.

In more particular embodiments of such a device, a congestion-based loss recovery module is coupled to the verification module to perform a second packet loss recovery that includes a reduction of the congestion window for the previously-transmitted packets that are associated with the packet loss indication and that have not been marked. In other particular embodiments, the packet loss indication includes at least one duplicate acknowledge (DUPACK), and in some cases a predetermined number of DUPACKS, received from the network for a particular previously-transmitted packet. Alternatively, other packet loss indications such as a packet acknowledge timeout notification may be used.

In accordance with another embodiment of the invention, a system is provided for increasing throughput over network connections experiencing data loss due to non-congestion-based packet loss. The system includes a network element coupled to a network, where the network element includes a receiver to receive packets transmitted via the network, and a transmitter to transmit a loss notification signal to sources of the packets experiencing the non-congestion-based packet loss. The system also includes a communication device coupled to the network element via the network. The communication device includes a receiver to receive the loss notification signal from the network element where the communication device is at least one of the sources of the packet experiencing the non-congestion-based packet loss. A packet marking module at the communication device is coupled to receive at least a portion of the loss notification signal and to mark the packet as potentially subject to non-congestion-based packet loss. The communication device's verification module is coupled to receive a packet loss indication and coupled to the packet marking module to determine whether the packet loss indication corresponds to any packet that have been marked. The communication device also includes a non-congestion-based loss recovery module coupled to the verification module to perform packet loss recovery, without requiring reduction of a congestion window, for the packets that are both associated with the packet loss indication and have been marked.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described various examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner of optimizing transport layer performance over links exhibiting bit errors, and particularly links exhibiting relatively high bit error rates such as wireless links. Packet loss due to bit errors are distinguished from packet loss due to congestion loss (e.g., buffer overflows), and an efficient and secure manner of recovering from losses due to bit errors is provided. In one embodiment of the invention, a signal is provided to a TCP sender regarding packet loss due to bit errors. Because such signals may be sent from any number of network elements in the network, they may be untrustworthy, and the signals provided to the TCP sender are used to "advise" the TCP sender of the bit error packet loss condition. Using this advice, the TCP sender uses its own loss detection mechanism to confirm that certain packets have been lost. Where a TCP sender confirms such advice in this manner, the TCP sender may alter its response accordingly. A number of advantages are provided using such a methodology, such as an improvement of the throughput of TCP connections (particularly on relatively high bit error links), security against malicious attacks, and the ability to use a single signaling protocol for all transport layer protocols that can use this signal. Further, such a methodology works with IPSec and does not require packet snooping in the network.

Figure 1:
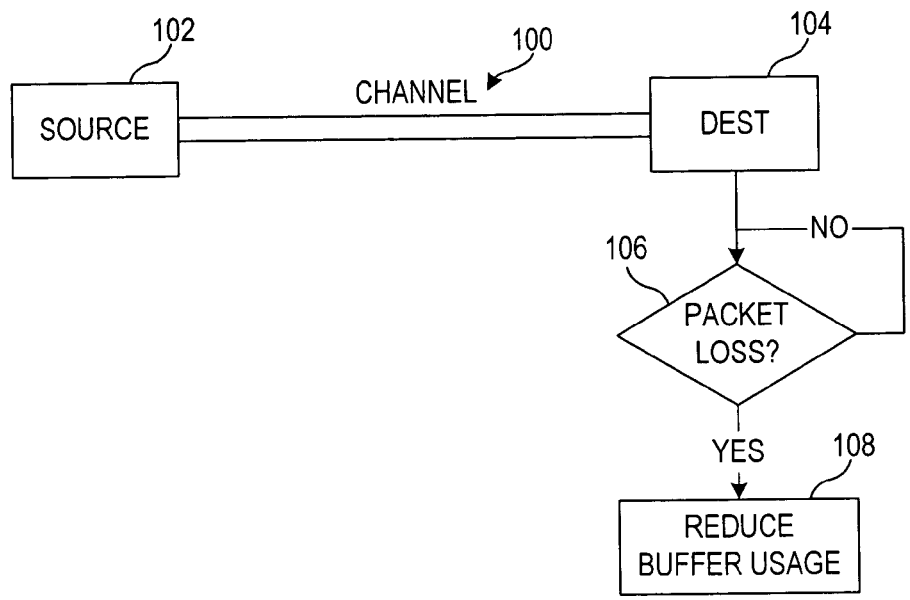
FIG. 1 illustrates a communication channel between a source and a network node and the standard recovery mechanism commonly employed.

Generally, packets are lost in a network due to two primary reasons: Packet Loss due to network Congestion (PLC), and Packet Loss due to Bit errors (PLB). PLC occurs when a router or other network element/node expends its physical memory and cannot queue further packets to schedule for departure from the node. PLB occurs due to the physical properties of the channel itself. Transport layer protocols such as TCP assume that all losses are caused by buffer overflow only (i.e., PLC), and it therefore reacts by reducing its share of buffer usage in the network (e.g., to half of its previous amount). For example, FIG. 1 shows a communication channel 100 between a source 102 and a node 104, where the node may represent an ultimate destination or an intermediary network node. If packet loss is detected as depicted at decision block 106, its share of buffer usage is reduced 108, regardless of the reason for packet loss. Since TCP assumes that all losses are caused by buffer overflow, this reduction in buffer usage is unnecessary where the cause of the loss is unrelated to network congestion, such as the case where packet loss occurs due to bit errors associated with the physical properties of the channel itself.

Figure 2:
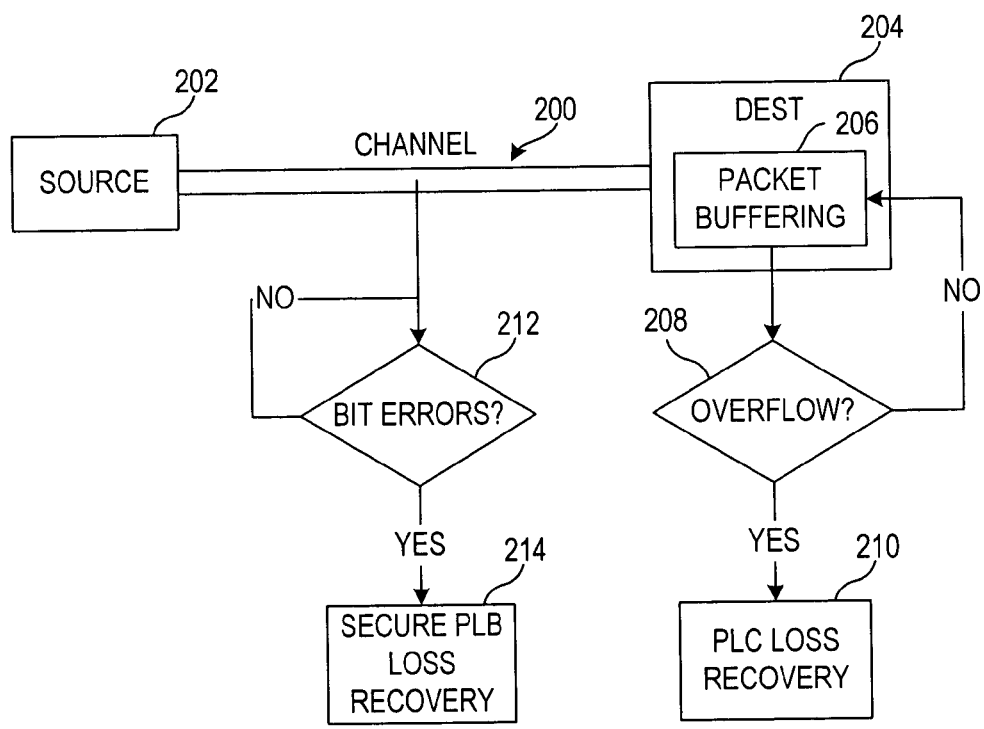
FIG. 2 illustrates one embodiment of the present invention, where Packet Loss due to Bit errors (PLB) is distinguished from Packet Loss due to Congestion (PLC)

FIG. 2 illustrates one embodiment of the present invention, where Packet Loss due to Bit errors (PLB) is distinguished from Packet Loss due to Congestion (PLC). More particularly, FIG. 2 shows a communication channel 200 between the source 202 and the node 204, where the node 204 may represent the ultimate destination or an intermediate network node. The node 204 may include packet buffering 206, where the PLC may be determined by ascertaining 208 whether any overflow of the buffer occurs. If so, PLC loss recovery 210 may be effected. On the other hand, if bit errors occur based on the physical properties of the channel 200 as depicted by decision block 212, secure PLC loss recovery 214 is effected in accordance with the present invention. In this manner, PLC is distinguished from PLB, and the PLB loss recovery is effected in a secure manner without unnecessarily impeding throughput. This is described in greater detail below.

Figure 3:
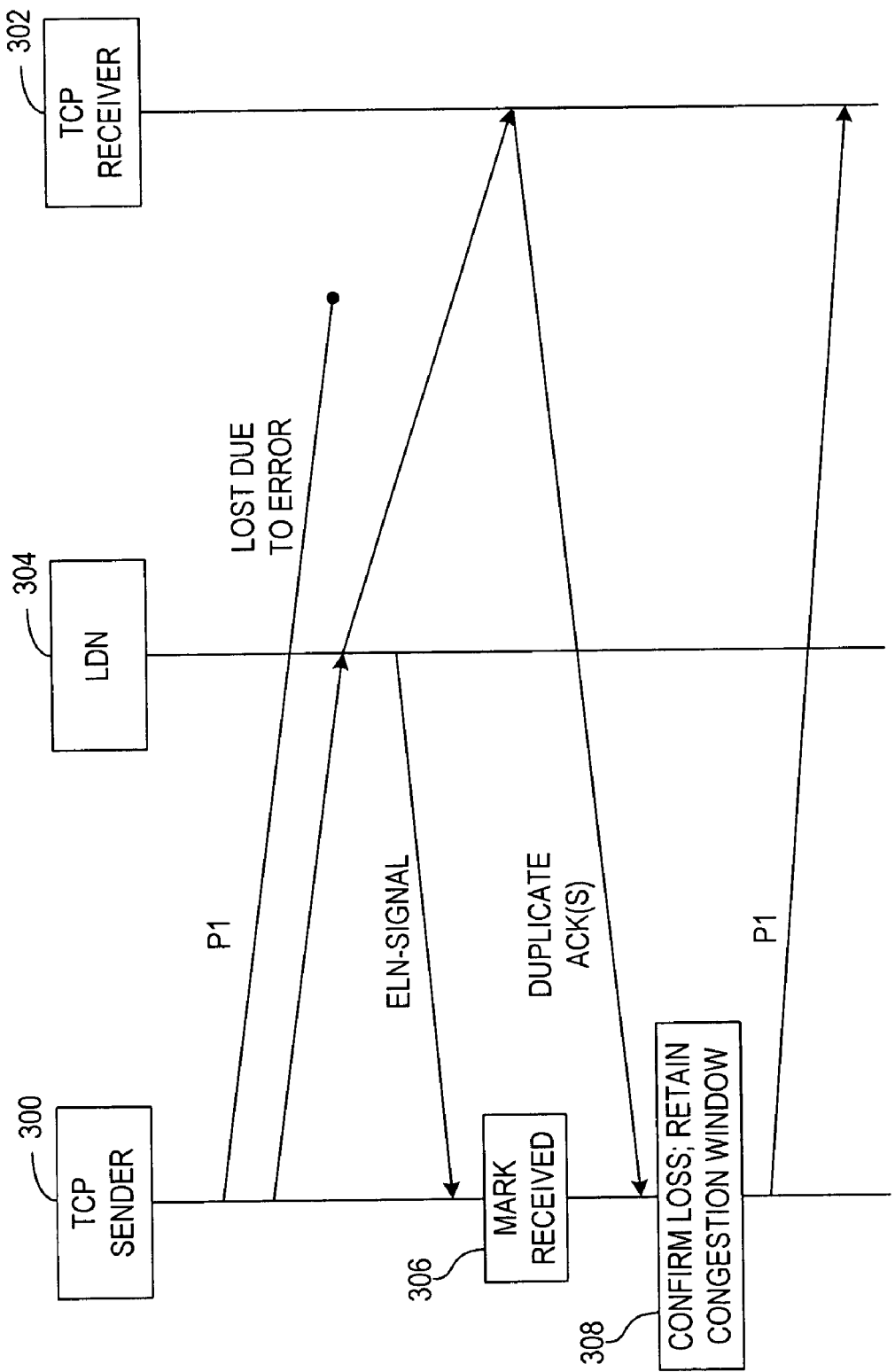
FIG. 3 is a representative message flow diagram illustrating one embodiment of the present invention.

FIG. 3 is a representative message flow diagram illustrating one embodiment of the present invention. For purposes of illustration, various embodiments of the invention (including the embodiment of FIG. 3) are described in terms of the Transport Control Protocol (TCP). However, the principles described herein are equally applicable to other transport layer protocols. In accordance with the illustrated embodiment of FIG. 3, a secure mechanism is provided to inform a TCP sender about bit errors, whereby this information is used to recover from such loss. The illustrated embodiment utilizes an explicit signal to advise a TCP sender about the packet loss due to bit errors. These signals are sent from arbitrary routers or other network nodes in the network, and may therefore be untrustworthy. To make the recovery safe against security threats, the signal is used by the TCP sender as "advice," and the TCP sender uses local loss detection mechanisms to confirm that certain packets have been lost. If the TCP sender has received this explicit signal, and has also determined that a packet has indeed been lost in the network, the TCP sender alters its response accordingly. FIG. 3 illustrates this process.

The TCP sender 300 of FIG. 3 sends a packet, P1, targeted for a TCP receiver 302. Associated with the communication path may be one or more intermediate network nodes 304, such as routers, wireless access points, or other such intermediary nodes. Such an intermediary node is referred to herein as a Loss Detection Node (LDN). If packet loss due to a bit error (PLB) has occurred, the LDN 304 sends an explicit signal, referred to herein as the Explicit Loss Notification (ELN) signal, to the TCP sender 300. This ELN signal is used to advise the TCP sender 300 that a PLB has occurred. When the TCP sender 300 receives the ELN signal, it marks 306 the appropriate packet as received (e.g., ELN_SIG_RECEIVED). After marking the packet as such, the TCP sender 300 continues normally, and does not initiate loss recovery at this time.

In one embodiment, the TCP sender 300 waits for the first duplicate acknowledge (ACK) packet(s) to arrive to trigger loss recovery. For purposes of facilitating an understanding of this aspect of the invention, duplicate ACKs are now generally described. As is known in the art, TCP assigns a sequence number to each byte transmitted by the TCP sender 300, and a positive ACK is then expected from the TCP receiver 302. If the ACK is not received within a timeout period, the data is retransmitted in order to guarantee reliable delivery. TCP generally sets the timeout period as a function of the Round Trip Time (RTT) expected between the two ends of the connection. However, with TCP, there are generally two indications of packet loss: occurrence of a timeout, and the receipt of "duplicate ACKs." TCP may generate an immediate acknowledgement (i.e., a duplicate ACK) when an out-of-order packet is received. This duplicate ACK informs the TCP sender that a packet was received out of order, and what the expected sequence number is. Since TCP does not know whether the receipt of the duplicate ACK resulted from a lost packet or a reordering of the packets at the TCP receiver, the TCP sender may wait to receive some predetermined number of duplicate ACKs before designating the particular packet as a lost. This is because a small number of duplicate ACKs may result where packet reordering is occurring, but a larger number of duplicate ACKs provides a stronger indication of packet loss.

In one embodiment, the present invention utilizes such duplicate ACKs as a manner in which the TCP sender 300 may confirm the previously-received "advice" from the LDN 304. More particularly, the TCP sender 300 waits to receive a predetermined number N (where N=1, 2, 3, etc.) of duplicate ACKs for the packet marked with ELN_SIG_RECEIVED. In one embodiment, receipt of a single duplicate ACK may be used to confirm the LDN's advice that PLB has occurred. A more conservative approach may not rely on receipt of a single duplicate ACK, but rather may rely on two, three, or more duplicate ACKs. The higher the number of duplicate ACKs required to be received at the TCP sender 300 to confirm the PLB situation, the higher the degree of certainty that the LDN's advice regarding PLB is accurate. However, in one embodiment, receipt of just a single duplicate ACK is sufficient to confirm the LDN's advice that PLB has occurred.

Upon receipt of the predetermined number of duplicate ACKs, the TCP sender 300 thus confirms 308 that packets marked 306 using the ELN signal have been lost using its own loss detection mechanism. Upon such confirmation, the TCP sender 300 may send the lost packet immediately, but the TCP sender 300 does not reduce its congestion window. This therefore differs from the case where packet loss is experienced due to congestion (i.e., PLC), and thus avoids reducing the congestion window in the case of PLB. In one embodiment of the invention, for each subsequent ACK received, the TCP sender 300 sends one new segment until the lost packet is recovered. Again, it is noted that TCP is used as the transport layer protocol for this and other illustrated embodiments of the invention, although the present invention is equally applicable to other protocols, such as TFRC, UPD, etc.

Figure 4:
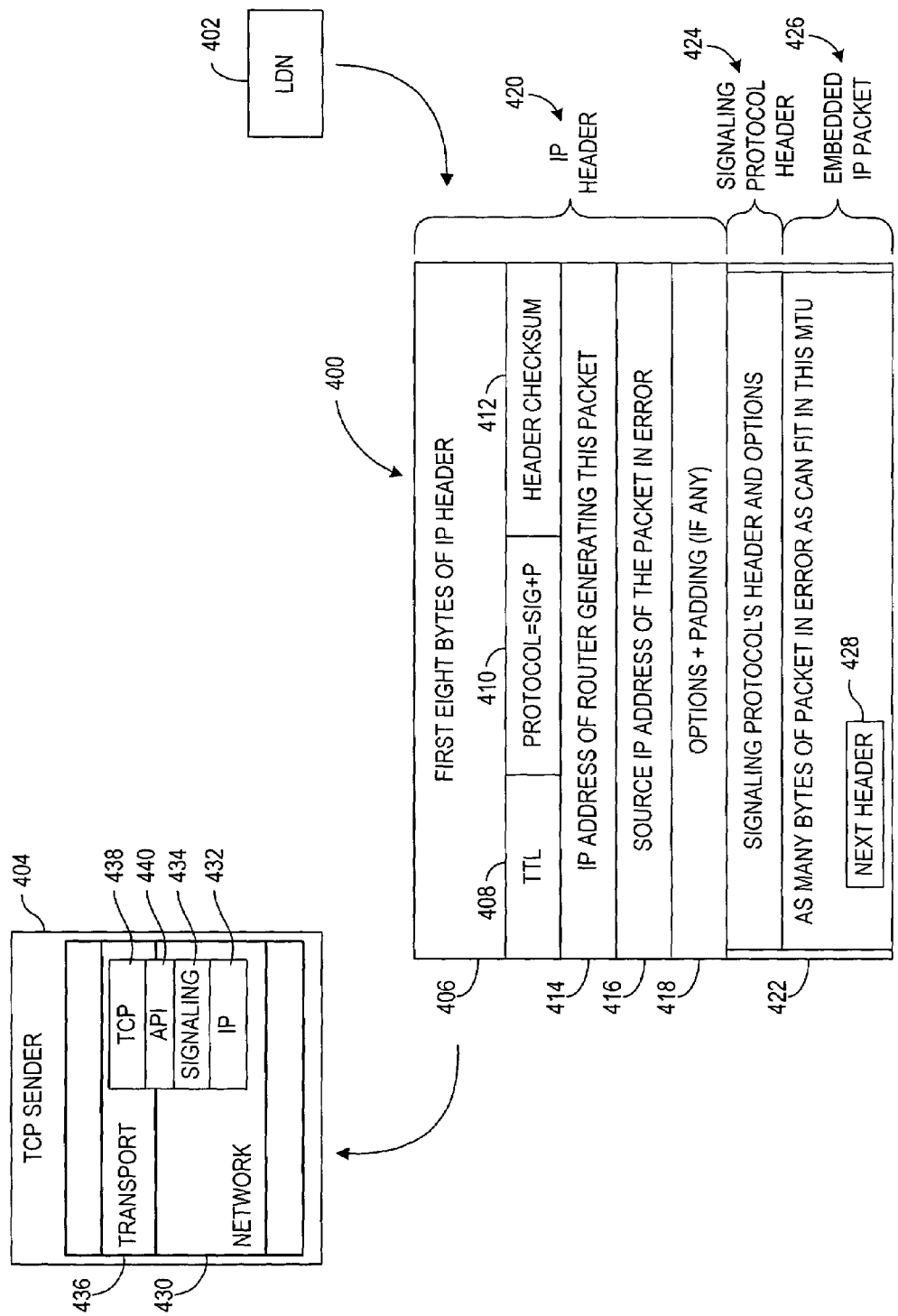
FIG. 4 illustrates one representative example of a signaling protocol format for providing a PLB notification from a network node to the sending node.

The PLB notification/advice provided by network nodes to the TCP sender, e.g. the ELN signal, may be provided in various manners. In one embodiment of the invention, the PLB notification is provided via a signaling protocol. Any number of different signaling protocols may be used in connection with the present invention. One representative example of a signaling protocol format 400 for providing the PLB notification (the ELN signal) is illustrated in FIG. 4. The embodiment of FIG. 4 assumes TCP and IP as the transport and network protocols respectively, however the invention is equally applicable to other protocols.

As FIG. 4 illustrates, a TCP receiver—a Loss Detection Node (LDN) 402 in the illustrated embodiment, sends an ELN signal as part of the packet 400 in response to recognizing packet loss due to bit errors (PLB). This signal provides the advice to the TCP sender 404 regarding the PLB, or more particularly, that PLB has occurred. The packet 400 represents an exemplary format in which such signal can be provided from the LDN 402 to the TCP sender 404.

In the illustrated embodiment, the network protocol is IP, and the packet 400 represents an IP datagram (particularly, an IPv4 datagram) encapsulating the ELN signal. However, other IP datagrams (e.g., IPv6) or other network layer protocols may alternatively be used. Assuming an IPv4 datagram for purposes of discussion, the first eight bytes 406 may include standard IP header information such as the IP version, the Internet Header Length (IHL), type of service, total length of the datagram, identification, control flags, and fragmentation offset. Other IP header fields include the Time to Live (TTL) field 408 indicating the maximum time the datagram is allowed to remain in the network system, a protocol field 410 indicating the next level protocol used in the data portion of the datagram, and a header checksum field 412. A source address, in this case the IP address of the router or other network element generating the packet 400, is provided in field 414. The destination address, in this case the source IP address of the packet in error, is provided in field 416. Options and padding (if any) are provided in field 418. These fields 406–418 represent the IP header 420 of the packet 400.

The ELN signal is embedded in the payload 422 of the packet 400. The signaling protocol's header and options are provided via field(s) 424, and the embedded IP packet 426 is provided as the data associated with the signaling protocol. The signaling protocol may be any signaling protocol. For example, the signaling protocol may be RSVP, which is a protocol for establishing end-to-end reservations, i.e., often for a guaranteed Quality of Service (QoS) path, between senders and receivers. Or, the signaling protocol may be Internet Control Message Protocol (ICMP) which delivers messages in IP packets, and may be used for out-of-band messages related to network operation. Any other signaling protocol may also be used.

The embedded IP packet 426 represents bytes from the packet in error, which was copied from IP and TCP headers from the packet in error by the LDN 402. In one embodiment, the LDN 402 copies as many bytes from the original packet (starting from the head of the IP packet) into the signaling protocol as can fit. One segment of information among these bytes is a next header field 428 which identifies the next header in the embedded IP packet 426, the use of which is described in greater detail below. The signal is then sent to the source IP address identified in field 416. This signaling can therefore be used for all kinds of protocols that may want to make use of this information.

The protocol field 410 will include a next header as some signaling protocol for the embedded signal provided in the IP packet payload 422. When the TCP sender 404 receives the signal packet 400, it will therefore be (in the illustrated embodiment) an IP packet 400 with the next header as some signaling protocol. The TCP sender 404 ultimately receives the packet 400 at the network layer 430, using the IP protocol 432 in the illustrated embodiment. The signal packet is forwarded to the signaling protocol layer 434 associated with the protocol identified in the protocol field 410 of the IP packet 400. The signaling protocol layer 434 extracts the embedded IP packet 426 from the packet 400, and identifies the next header 428 in the embedded IP packet 426.

The signaling protocol 434 may take different actions depending on the particular protocol identified in the next header 428 of the embedded IP packet 426. As an example, if the next header 428 identifies TCP, the signaling protocol 434 can inform the transport layer 436 (a TCP layer 438 in this example) about the PCB. More particularly, the signaling protocol may inform the socket with the same source port and destination port in the list of TCP sockets. It should be noted that since the signaling protocol 434 and TCP 438 are implemented within the same machine, there is no need to have a protocol for communication between the TCP layer 438 and the signaling protocol 434. Rather, an Application Programming Interface (API) 440 is sufficient. Different "next protocol" examples other than TCP are described more fully below.

When the transport layer 436 receives the information from the signaling layer 434, it can perform a variety of actions. However, in accordance with an exemplary embodiment of the invention, the transport layer 436 does not react solely on receipt of the ELN signal. In other words, in such an embodiment, the transport layer 436 obtains sufficient proof from local mechanisms to verify that the purported information from the LDN 402 is valid. This provides security and protects against receipt of such a signal from an untrustworthy LDN. As will be described in greater detail below, the transport layer 436 verifies the information locally, and takes the appropriate loss recovery actions depending on whether a signal has previously been received from an LDN indicating PLB.

Figure 5:
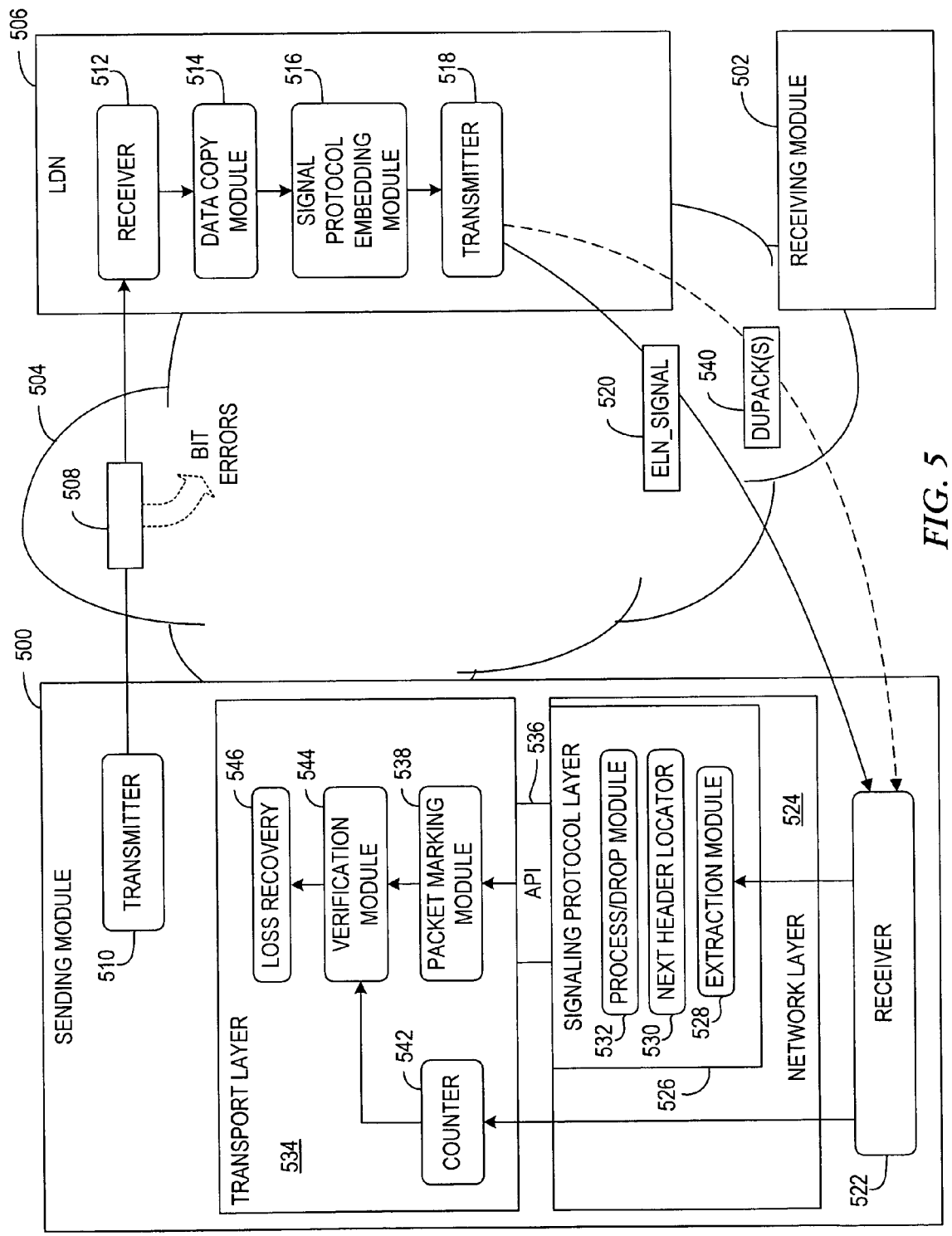
FIG. 5 is a block diagram illustrating a more particular embodiment of the PLB loss processing in accordance with the present invention.

FIG. 5 is a block diagram illustrating a more particular embodiment of the PLB loss processing in accordance with the present invention. In the illustrated embodiment, a sending module 500 is to send information to a receiving module 502. For example, the sending module 500 may be a terminal, such as a computing device coupled to a network 504 via wired connections, or a mobile device coupled to the network 504 via wireless means. Wireless connections generally experience greater packet loss due to bit error (PLB) than their wired counterparts, and therefore the present invention is particularly useful in the case of wireless sending modules 500. Such wireless sending modules 500 may include, for example, mobile phones, Personal Digital Assistants (PDAs), laptop/notebook computers, and the like. In the case of wireless sending modules, the network 504 represents at least a wireless network (e.g., GSM, GPRS, PCS, CDMA, UTMS, etc.) and possibly involving other networks such as LANs, the Internet, etc. The receiving modules 502 may represent other wireless devices, servers, computers, etc.

Along the transmission path between the sending and receiving modules, the information may traverse one or more intermediary nodes on the network 504. One such intermediary node is represented by the LDN 506. The sending module 500 transmits packets, such as packet 508, via a transmitter 510. On its way to the receiving module 502, the packet(s) 508 may first be directed to the LDN 506, and may experience PLB. The LDN 506 receives the packet(s) 508 via a receiver 512, and can determine PLB. For example, the LDN 506 may determine that PLB has occurred using checksum information in the packet 508 header.

If the LDN 506 determines that PLB has occurred, the data copy module 514 copies enough data from the appropriate headers (e.g., IP and TCP headers), and embeds this data into a signaling protocol via the signal protocol embedding module 516. The data copy module 514 and signal protocol embedding module 516 may be implemented, for example, in software operable on a processing device at the LDN 506. Via the transmitter 518, the LDN 506 then sends the data by way of the signaling protocol to the source IP address of the packet 508. As shown in FIG. 5, the ELN signal represents the data provided via the signaling protocol, which may in turn be embedded in an IP packet.

When the sending module 500 receives the signal packet 520 via the receiver 522, network layer 524 processing occurs to forward the signal packet 520 to the signaling protocol layer 526. An extraction module 528 extracts the embedded IP packet (or other network layer protocol packet) in the signaling (message) packet 520, and the next header locator 530 identifies the next header in the embedded IP packet. A process/drop module 532 takes various actions depending on what the identification of the next header protocol. If the next header identifies certain next header protocols, particular processing actions may be taken depending on the particular protocol identified. If the next header does not identify one of the protocols desired or expected, the process/drop module may drop the packet.

For purposes of the discussion of FIG. 5, it is assumed that the next header identified a TCP protocol. Other transport layer protocols are analogously handled, including but not limited to protocols such as TFRC, UDP, etc. In the case of TCP, the signaling protocol layer 526 communicates with the transport layer 534 via an API 536, where the TCP layer marks the packet as "received" via the packet marking module 538. For example, the packet may be marked as "ELN signal received" to identify that packet as being identified by the LDN 506 as being subject to PLB. The transport layer 534 continues processing in the usual manner, and in one embodiment of the invention continues processing until the sending module 500 receives N duplicate ACKs (DUPACKs) 540, where N represents the number of DUPACKs required to infer packet loss for the particular implementation. This number may be anywhere in the range of one up to the size of the congestion window (cwnd).

The counter 542 counts the number of DUPACKs received for a packet. The verification module 544 determines whether packets are marked via the packet marking module 538 with "ELN signal received," when the requisite number of DUPACKs have been received. In one embodiment of the invention, if the verification module 544 recognizes that the particular number of DUPACKs have been received for a packet marked with "ELN signal received," the lost packet is sent immediately, but the congestion window is not reduced. More particularly, if the lost packet is not marked with "ELN signal received," the loss recovery module 546 may follow a standard congestion response methodology, such as that described in IETF RFC 2581 (April 1999), entitled "TCP Congestion Control," by M. Allman, V. Paxson, and W. Stevens. Alternatively, if the lost packet is marked with "ELN signal received," the loss recovery module 546 will perform a different loss recovery where the lost packet is sent as well as new packets, and a particular loss recovery is performed without reducing the congestion window. This is advantageous for purposes of throughput, and thus one embodiment of the invention increases throughput in a secure manner in the case of PLB.

Figure 6:
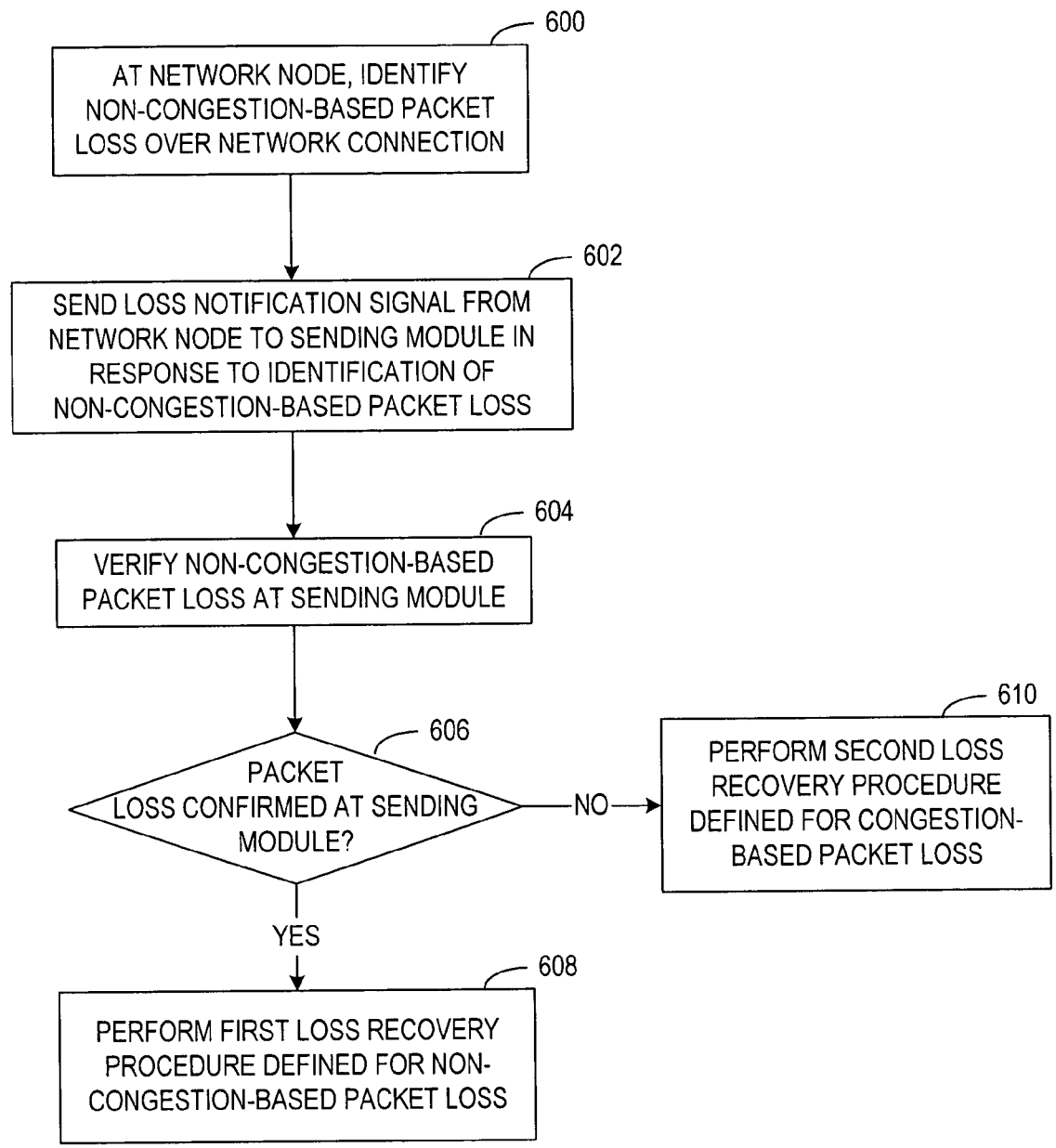
FIG. 6 is a flow diagram illustrating one embodiment of a method for increasing throughput over network connections experiencing data loss due to non-congestion-based packet loss in accordance with the present invention.

FIG. 6 is a flow diagram illustrating one embodiment of a method for increasing throughput over network connections experiencing data loss due to non-congestion-based packet loss in accordance with the present invention. A network node, e.g., an LDN, identifies 600 non-congestion-based packet loss over a network connection between a sending module and the network node. Non-congestion-based packet loss as used herein does not necessarily indicate that congestion cannot affect packet loss, but rather indicates that the packet loss is not primarily due to packet loss. An example of such a non-congestion-based packet loss is packet loss due to bit errors (PLB), where the loss is not primarily (or in some cases at all) related to congestion in the network. Rather, PLB is primarily a result of properties of the physical channel, whether it be a physical conductor, electromagnetic waves, etc.

In response to identifying the non-congestion-based packet loss at the network node, the network node sends 602 a notification signal (e.g., ELN signal) to the sending module associated with the packet in error. The sending module verifies 604 the non-congestion-based packet loss. Examples of such verification were previously described, and are described in further detail below. It is determined 606 whether the packet loss is confirmed at the sending module, and if so, a first loss recovery procedure defined for the non-congestion-based packet loss is performed 608. In one embodiment, this first loss recovery procedure recovers from PLB in a manner different from congestion-based packet loss such as PLC. More particularly, one embodiment of the present invention avoids the need to reduce the congestion window in response to verification of PLB, thereby increasing throughput relative to using standard congestion-based methodologies. On the other hand, if the non-congestion-based packet loss is not corroborated at the sending module, a second loss recovery procedure different than the first loss recovery procedure is performed 610. Such second loss recovery procedure may be a standard congestion-based or other known loss recovery procedure.

Figure 7:
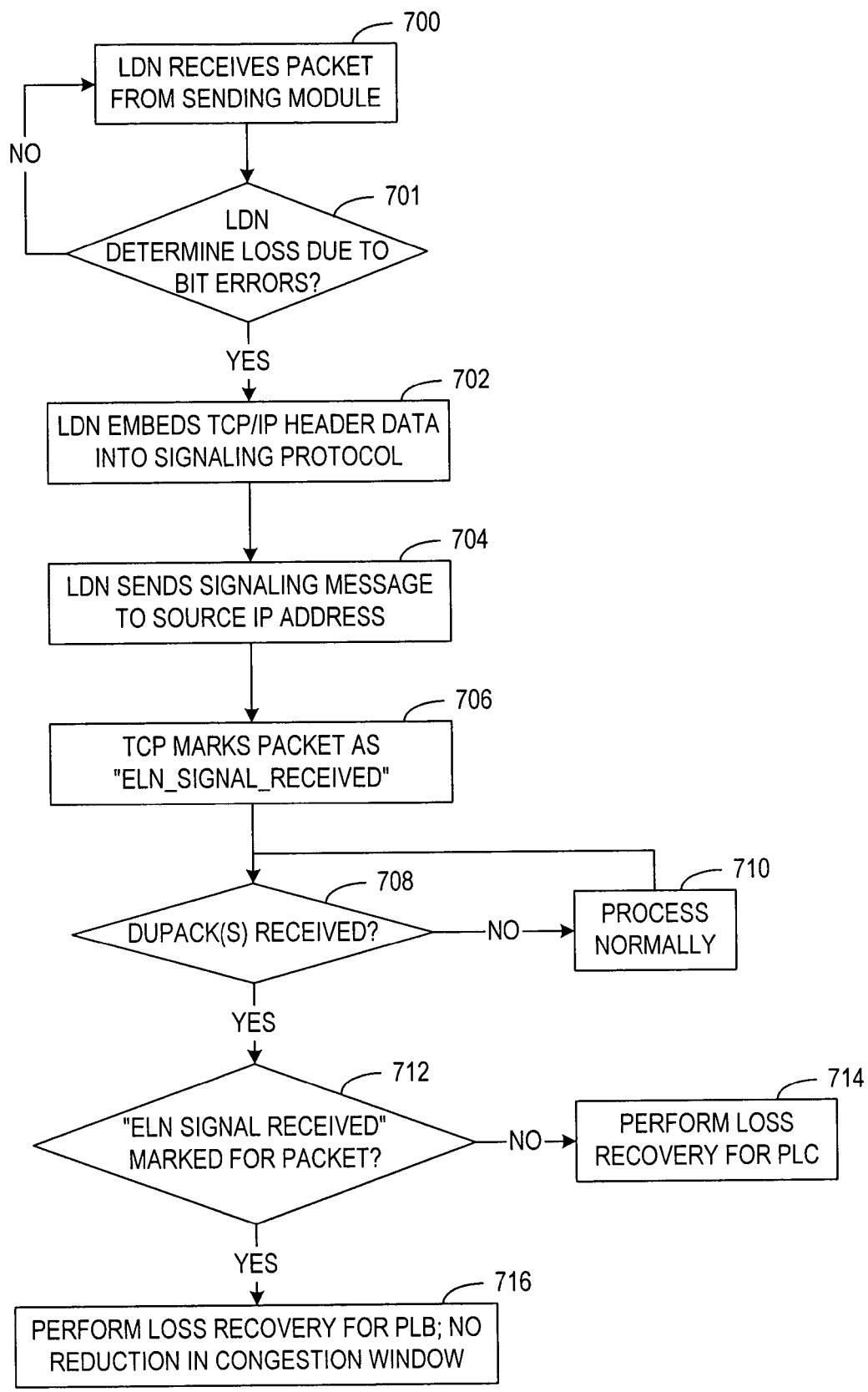
FIG. 7 is a flow diagram illustrating a more particular embodiment of a method for increasing throughput over network connections experiencing data loss due to non-congestion-based packet loss in accordance with the present invention.

FIG. 7 is a flow diagram illustrating a more particular embodiment of a method for increasing throughput over network connections experiencing data loss due to non-congestion-based packet loss in accordance with the present invention. In the illustrated embodiment of FIG. 7, an LDN receives 700 a packet(s) from a sending module, and determines 701 whether the loss is due to bit errors (PLB). If so, the LDN embeds 702 TCP/IP header data (or other header data depending on the network/transport protocols) into the signaling protocol. The LDN sends 704 the signaling message to the source IP address of the sending module of the packet in error. The transport layer, e.g., the TCP layer in the illustrated embodiment, marks 706 the packet to record the fact that the LDN has advised the sending module that PLB has occurred. For example, a flag or other designation may be stored and associated with the packet in error. Such flag/designation is labeled "ELN_SIGNAL_RECEIVED" in the illustrated embodiment.

The sending module then attempts to verify this advice from the LDN. In one embodiment, this is accomplished by recognizing one or more duplicate ACKs at the sending module. Until the particular number of duplicate ACKs (DUPACKs) have been received as determined at decision block 708, processing continues normally as illustrated at block 710. When the particular number of DUPACKs have been received, it is determined 712 whether the packet associated with the DUPACK has been marked (e.g., "ELN_SIGNAL_RECEIVED"). If not, standard loss recovery such as that known for PLC is performed 714. If the packet associated with the DUPACK has been marked, a PLB-suited loss recovery is performed 716, which in one embodiment causes no reduction in the congestion window.

Blocks 700–704 generally illustrate actions taken at the LDN in one embodiment of the invention. In one embodiment, the LDN should not try to snoop into each packet to determine if it is a TCP (or other transport layer protocol) packet or not. In such an embodiment, the LDN should simply copy as many bytes as can fit from the original packet (starting from the head of the IP packet) into the signalling protocol, and send the resulting signal to the source IP address of the packet in error. This signalling can therefore be used for all kinds of protocols that may want to make use of this information. In addition, if the packet in error was encrypted via the IP Security Encapsulating Security Payload (IPSec ESP) scheme, depending upon the encryption scheme used to encrypt the packet, the sender node will be able to decrypt the IP packet and determine the information that would have been encrypted at the network node. For example, if the packets were encrypted using 256-bit keys and Cypher Block Chaining (CBC), then the sender node will be able to decrypt all of the first 256-bit blocks of data sent by the network node. If the fragment sent from the LDN is sufficiently large, the sender node will be able to determine the sequence number of the packet that was lost. The same holds true for other types of encryption algorithms such as Output Feedback Mode (OFB), Cipher Feedback Mode (CFB), etc.

Figure 8:
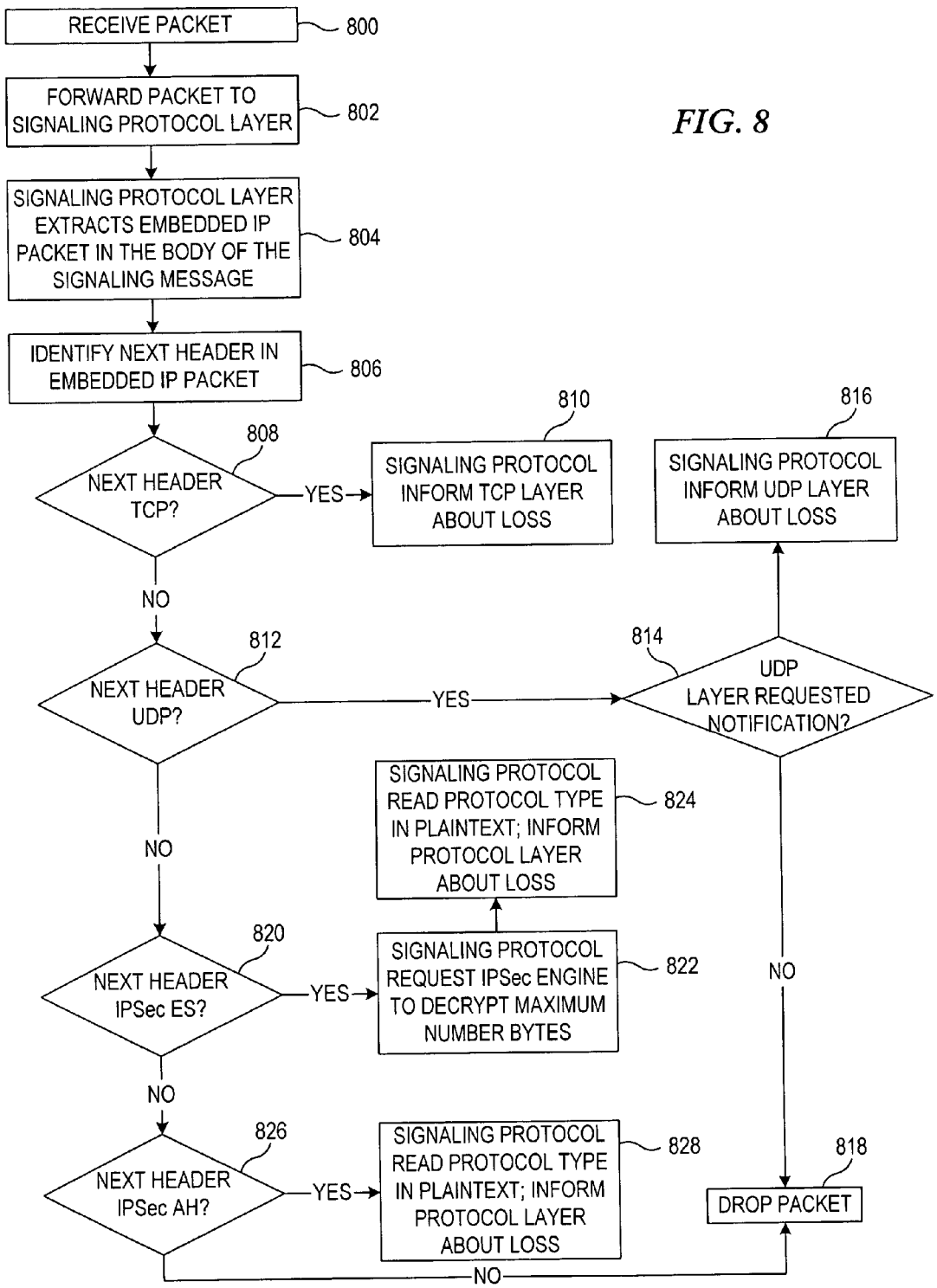
FIG. 8 is a flow diagram illustrating representative actions taken at the sender node at the network layer in accordance with one embodiment of the invention.

FIG. 8 is a flow diagram illustrating representative actions taken at the sender node at the network layer in accordance with one embodiment of the invention. A packet is received 800, and forwarded 802 to the signaling protocol layer. In the illustrated embodiment, the received packet is an IP packet with the next header as some signaling protocol. The signaling protocol layer extracts 804 the embedded IP packet in the signaling message, and identifies 806 the next header in the embedded IP packet.

Depending on the state of the next header, different actions may be taken. For example, if the next header present is TCP as determined at decision block 808, the signaling protocol informs 810 the TCP layer about such loss. More particularly, the signaling protocol informs the socket with the same source-port and destination-port in the list of TCP sockets. If the next header is UDP as determined at decision block 812, and if the UDP layer has requested to be notified of such a signal as determined at decision block 814, the signaling protocol will inform 816 the UDP layer about the loss. If the UDP layer has not requested ELN service, the packet is dropped 818 without further processing.

In virtual private networking (VPN) or other private communication situations, security may be provided by, for example, IPsec in ESP mode. Generally, IPSec defines extensions to the IP protocol in the form of additional headers for IP packets. Encapsulating Security Payload (ESP) provides confidentiality by encrypting a packet before transmitting it. If the next header identifies IPSec in Encapsulated Security (ES) as determined at decision block 820, the signaling protocol may request 822 that the IPSec engine decrypt as many bytes of data as possible with the specified security association index in the IPSec header of the embedded packet. When the IPSec layer has processed this information, the signaling protocol should be able to read 824 the protocol type and other information in plaintext, and the signaling layer may inform the protocol layer about the loss depending on the particular transport protocol (i.e., return to decision block 808, 812, etc.).

As previously indicated, IPSec defines extensions to the IP protocol in the form of additional headers for IP packets. An Authentication Header (AH) verifies the authenticity of the packet's contents, thus providing authentication, integrity, protection against replaying for the entire packet, etc. If the next protocol is IPSec in AH mode as determined at decision block 826, the signaling layer should be able to read 828 the transport layer protocol in plaintext, and may inform the protocol layer about the loss depending on the particular transport protocol (i.e., return to decision block 808, 812, etc.). It is noted that if both ES mode and AH mode are used, one embodiment of the invention treats the packet only as ES mode, and AH action is not performed since AH requires that the packet be present in full.

Other "next header" options in addition to those set forth in decision blocks 808, 812, 820, and 826 may also be implemented in accordance with the present invention. Thus, existing and/or future protocols that can make use of such signaling should be able to take advantage of this methodology as well. If none of the particular options are found in the next header, the packet is dropped 818 in accordance with one embodiment of the invention.

It is noted that if IPSec is used in "tunnel" mode, an IPSec tunnel may try to decrypt the embedded packet. IPSec tunnelling generally refers to the secure connection over logical networks that connect physical networks or single hosts to each other by forming encrypted tunnels between security gateways over public networks. However, the IPSec tunnelling feature can be exploited for a Denial Of Service (DOS) attack where the attacker sends bogus signals to the security gateway and forces it to engage in the computationally-intensive process of decrypting these packets. To prevent such a DOS attack, the security gateway should not rely only on the sequence number and security association (SPI), but before decrypting the packet, it should use the IV (initialisation vector) to verify that the IV is a valid IV before decrypting the entire packet. It is noted that in some cases IV may be encrypted, and a security gateway may need to decrypt the IV before proceeding further. It is also noted that if the encryption algorithm does not use an IV, it may choose to drop the packet without further processing. Once the security gateway has decrypted the message, it should forward the signal to the appropriate host.

Figure 9:
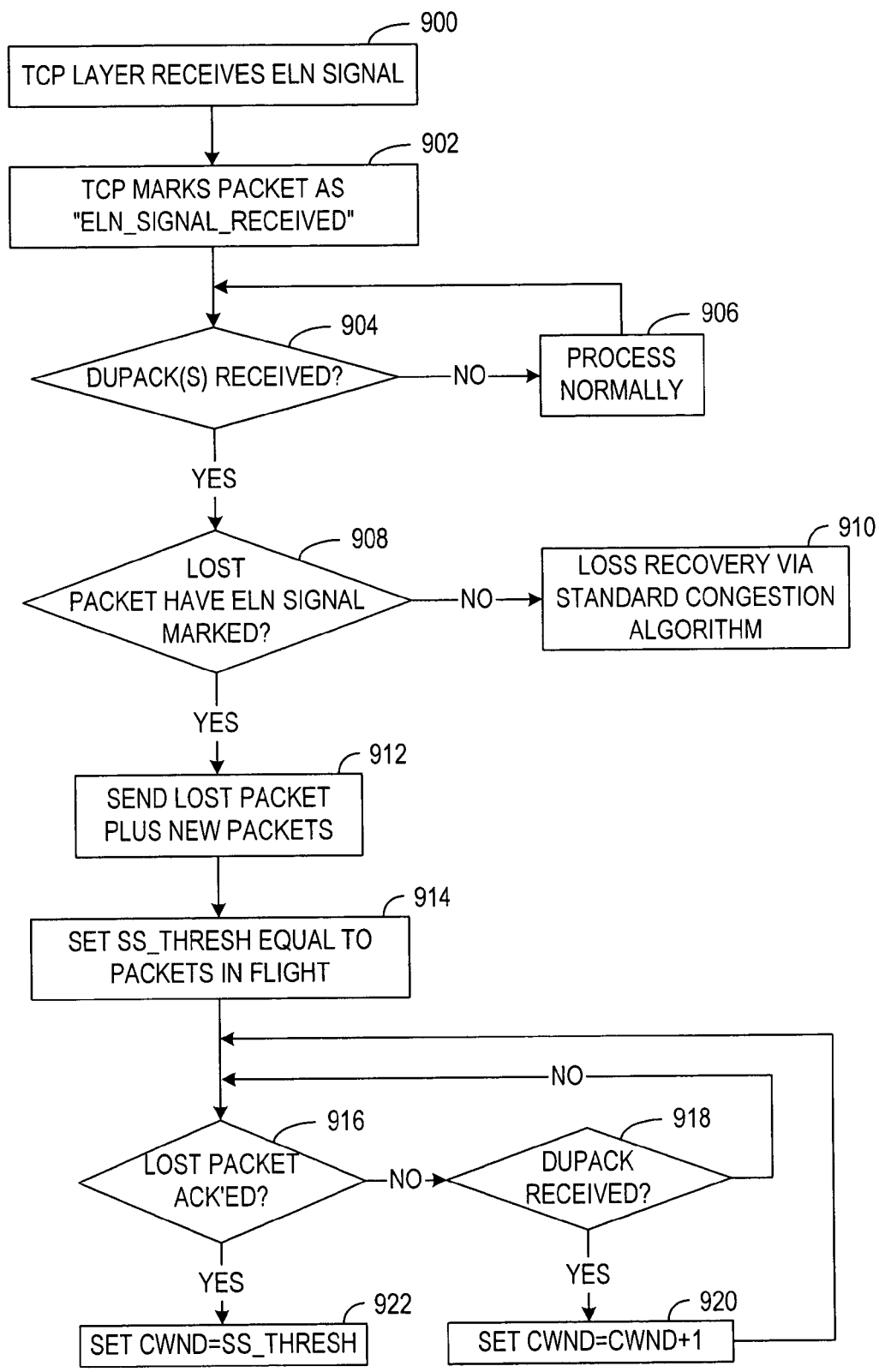
FIG. 9 is a flow diagram illustrating representative actions taken at the sender node at the transport layer in accordance with one embodiment of the invention.

FIG. 9 is a flow diagram illustrating representative actions taken at the sender node at the transport layer in accordance with one embodiment of the invention. When the transport layer receives information from its signaling layer, it can perform a variety of actions. However, in accordance with one embodiment of the present invention, the transport layer should not react based only on the ELN signal (although it may). Rather, the transport layer should obtain sufficient proof from it's own in-band mechanism to verify that the purported information from the LDN is valid. The embodiment of FIG. 9 describes just one scheme of action, particularly for TCP. Analogous schemes can, however, be extended to other protocols such as TCP-Friendly Rate Control (TFRC), UDP, etc.

When the TCP layer receives 900 the ELN signal from the LDN, it marks 902 the packet as received. It continues processing normally 906 until the sending node receives N duplicate ACKs as determined at decision block 904, where "N" represents the number of duplicate ACKs needed to infer packet loss for the particular implementation (1<N<congestion window). If the duplicate ACKs indicate that the lost packet does not have the ELN signal marked as determined at decision block 908, loss recovery is performed 910 via a standard congestion algorithm such as RFC 2581. Otherwise, non-congestion-based loss recovery is performed in accordance with the present invention.

Block 912–922 illustrate one manner in which the present invention performs loss recovery processing upon verifying advice provided by the LDN. More particularly, if the lost packet is marked with "ELN signal received," loss recovery is performed such that the congestion window need not be reduced. Various loss recovery procedures may be employed, and the embodiment of FIG. 9 is provided as a representative example of one such method. Thus, the embodiment of FIG. 9 sets forth one particular scheme of action for the case of TCP, but the schemes can be extended to other protocols.

As previously described, it is determined 908 whether the lost packet has an ELN signal marked. If not, the loss recovery may follow a standard congestion response methodology, such as that described in IETF RFC 2581, as shown at block 910. Such standard congestion response methodologies are now briefly described, which may include interoperable concepts such as slow start, congestion avoidance, fast retransmit, fast recovery, and/or other congestion control algorithms. Slow start (SS) and congestion avoidance algorithms are used by a sender to control the amount of outstanding data being introduced into the network. Generally, congestion control uses various parameters, including the congestion window (cwnd) and the slow start threshold (SS_THRESH). The cwnd is a state variable that refers to the sender-side limit of the quantity of data that the sender can transmit into the network before receiving an acknowledgement (ACK). The SS_THRESH is a threshold value used to determine whether the slow start or congestion avoidance algorithm should be used to control data transmission. When segments are first introduced into the network, the conditions are unknown, and the transport layer may slowly probe the network to ascertain the available capacity for the particular path. This is performed to minimize the chances of causing congestion in the network. For example, where TCP is used as the transport layer protocol, the TCP may set the cwnd to one Maximum Segment Size (MSS), and send one full-sized segment. If this segment is acknowledged (ACK'd) before the timeout, the sender may increase the cwnd by one MSS and send out two full-sized segments. SS_THRESH may initially be set to a high value (e.g., 0xFFFF). The process of increasing the cwnd and sending out additional full-sized segments may continue as long as the cwnd is below SS_THRESH, and the ACKs arrive before their corresponding timeouts. This is referred to as the "slow start" phase, at which time cwnd may grow exponentially. Thus, slow start may be used when data transfers are initiated, or in response to detected segment loss, or in any event when cwnd<SS_THRESH. Slow start ends when cwnd>SS_THRESH, or when congestion is identified. Congestion avoidance methodologies may thus be initiated when cwnd>SS_THRESH. In one case, cwnd grows linearly once reaching the SS_THRESH. For example, cwnd may be incremented by one full-sized segment per round-trip time (RTT). Other formulas may be used to update cwnd as well. When congestion is detected (e.g., when a retransmission timeout occurs), the SS_THRESH may be set to a lesser value such as one half the current cwnd, and cwnd may be reset to one MSS. Other standard congestion methodologies may also be utilized.

If the lost packet has an ELN signal marked for that packet (thereby indicating LDN advice of PLB), the following loss recovery may be used for TCP implementations. The lost packet, plus any new packets, are sent 912. In TCP recovery, the slow start threshold (SS_THRESH) is set equal to the packets "in flight," as shown at block 914. Until the lost packet is acknowledged, the congestion window (cwnd) is incremented for each duplicate ACK received. More particularly, it is determined 916 whether the lost packet has been acknowledged. If not, it is determined 918 whether a duplicate ACK has been received, and if a duplicate ACK has been received, the congestion window is incremented 920 by one. This monitoring and congestion window incrementing continues until the lost packet has been ACK'ed, at which time the congestion window is set 922 equal to the slow start threshold.

It is noted that the non-congestion-based loss recovery embodiment of FIG. 9 is not necessarily the most conservative approach possible, and there are various other more conservative approaches that may be used as a response methodology. The methodology of FIG. 9 is provided for purposes of facilitating an understanding of the manner in which loss recovery may be effected, but other loss recovery methodologies may be used. It is also noted that in such a procedure, the number of packets outstanding in the network—until the lost packet is recovered—is roughly equal to the congestion window before the loss occurred. This is twice the amount had a standard congestion response methodology (e.g., RFC 2581) been used.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, while the present invention is described to address packet loss due to bit errors (PLB), the present invention is equally applicable to other non-congestion-based packet loss. More particularly, while standard congestion recovery procedures currently address situations relating to congestion-related packet loss, the present invention is applicable to PLB as well as other packet loss situations not addressed by standard congestion-based packet loss solutions. As a more particular example, the present invention may be extended to address situations where the LDN inadvertently dropped a packet(s) or otherwise inadvertently corrupted data, rather than the bit errors occurring over the connection between the sender and LDN. Other similar scenarios unrelated to network congestion are also conceivable, and the present invention may be used to enhance throughput in such situations. It is therefore intended that the scope of the invention be limited not with this detailed description, but rather defined by the claims appended hereto.

What is claimed is:

1. A method for increasing throughput over network connections experiencing data loss due to non-congestion-based packet loss, comprising:
   identifying, at a network node, non-congestion-based packet loss over a network connection between a sending module and the network node;
   sending a loss notification signal from the network node to the sending module in response to identification of the non-congestion-based packet loss;
   verifying the non-congestion-based packet loss at the sending module independently of the receipt of loss notification signals; and
   performing a first loss recovery procedure, different from a second loss recovery procedure associated with congestion-based packet loss, if the non-congestion-based packet loss is verified at the sending module.

2. The method of claim 1, wherein the non-congestion-related packet loss comprises packet loss due to bit errors (PLB).

3. The method of claim 1, wherein sending a loss notification from the network node comprises embedding data associated with the packet experiencing packet loss into a signaling protocol packet, and sending the signaling protocol packet as the loss notification to the sending module.

4. The method of claim 3, wherein sending the signaling protocol packet to the sending module further comprises embedding the signaling protocol packet into the payload of a network layer packet, and sending the signaling protocol packet to the sending module via the network layer packet.

5. The method of claim 4, wherein verifying the non-congestion-based packet loss comprises:
   forwarding the signaling protocol packet from a network layer of the sending module to a signaling protocol layer of the sending module;
   identifying a transport layer protocol in a next header field within the data embedded in the signaling protocol packet;
   informing the identified transport layer protocol of the non-congestion-based packet loss; and
   verifying the non-congestion-based packet loss via the identified transport layer protocol.

6. The method of claim 5, wherein verifying the non-congestion-based packet loss via the identified transport layer protocol comprises:
   marking the packet experiencing non-congestion-based packet loss to indicate that the loss notification signal was received from the network node for the packet; and
   enabling the performance of the first loss recovery procedure in response to receipt of a predetermined number of duplicate acknowledge packets from the network node for the marked packet.

7. The method of claim 5, further comprising dropping the signaling protocol packet if the transport layer protocol in the next header field is not among a predetermined group of transport layer protocols.

8. The method of claim 5, wherein the transport layer protocol comprises any one of TCP, UDP, and TFRC.

9. The method of claim 4, wherein the network layer packet comprises an Internet Protocol (IP) packet.

10. The method of claim 4, wherein the network layer packet comprises a protocol field identifying a protocol of the signaling protocol packet.

11. The method of claim 3, wherein embedding data associated with the packet experiencing non-congestion-based packet loss comprises copying as many bytes from the packet experiencing non-congestion-based packet loss as can fit into the signaling protocol packet within the network layer packet.

12. The method of claim 3, wherein the signaling protocol packet comprises a next header field identifying a transport layer protocol of the sending module.

13. The method of claim 1, wherein verifying the non-congestion-based packet loss at the sending module comprises:
    marking the packet experiencing non-congestion-based packet loss to indicate that the loss notification signal was received from the network node for the packet; and
    enabling the performance of the first loss recovery procedure in response to receipt of a predetermined number of duplicate acknowledge packets from the network node for the marked packet.

14. The method of claim 13, further comprising continuing normal communication at the sending module during a time required to receive the predetermined number of duplicate acknowledge packets.

15. The method of claim 1, wherein performing the first loss recovery procedure comprises:
    sending the packet experiencing packet loss;
    setting a slow start threshold equal to a number of packets in flight;
    until the packet experiencing packet loss is acknowledged, incrementing a congestion window for each duplicate acknowledge received; and
    setting the congestion window equal to the slow start threshold when the packet experiencing packet loss is acknowledged.

16. The method of claim 1, wherein the second loss recovery procedure comprises a Transmission Control Protocol (TCP) congestion response procedure.

17. The method of claim 1, wherein identifying non-congestion-related packet loss comprises distinguishing between congestion-related packet loss and non-congestion-related packet loss over the network connection.

18. The method of claim 1, wherein identifying non-congestion-related packet loss comprises identifying bit errors associated with a packet transmitted to the network node using checksum information provided to the network node via the packet.

19. The method of claim 1, wherein the network connection comprises at least one of a wireless link and a wired link.

20. A communication device for communicating information over a network, comprising:
    a receiver for receiving indications of packet loss due to bit errors (PLB) pertaining to one or more packets previously transmitted via the communication device;
    a packet marking module coupled to receive the PLB indications and to mark the respective previously-transmitted packets as potentially subject to PLB;
    a verification module coupled to receive a packet loss indication and coupled to the packet marking module to determine whether the packet loss indication corresponds to any of the previously-transmitted packets that have been marked; and
    a non-congestion-based loss recovery module coupled to the verification module to perform packet loss recovery without requiring reduction of a congestion window for the previously-transmitted packets that are both associated with the packet loss indication and have been marked.

21. The communication device as in claim 20, further comprising a congestion-based loss recovery module coupled to the verification module to perform a second packet loss recovery that includes a reduction of the congestion window for the previously-transmitted packets that are associated with the packet loss indication and that have not been marked.

22. The communication device as in claim 20, wherein the packet loss indication comprises at least one duplicate acknowledge (DUPACK) received from the network for a particular previously-transmitted packet.

23. The communication device as in claim 20, wherein the packet loss indication comprises a predetermined number of duplicate acknowledges (DUPACKs) received from the network for a particular previously-transmitted packet.

24. The communication device as in claim 23, further comprising a counter module coupled to the receiver to count the DUPACKs received from the network for the particular previously-transmitted packet.

25. The communication device as in claim 20, wherein the packet loss indication comprises a packet acknowledge timeout notification.

26. The communication device as in claim 20, further comprising a signaling protocol module coupled to receive the PLB indication, extract embedded information from the PLB indications, and to identify a next header indication in embedded information to notify a transport layer identified by the next header indication of the potential PLB.

27. The communication device as in claim 26, wherein the signaling protocol module is coupled to the packet marking module at the transport layer via an application programming interface (API).

28. The communication device as in claim 20, wherein the communication device comprises a mobile device capable of wireless communication via a wireless network.

29. The communication device as in claim 20, wherein the communication device comprises a device coupled to communicate via a landline network.

30. A system for increasing throughput over network connections experiencing data loss due to non-congestion-based packet loss, comprising:
    (a) a network element coupled to a network comprising:
        (i) a receiver to receive packets transmitted via the network; and
        (ii) a transmitter to transmit a loss notification signal to sources of the packets experiencing the non-congestion-based packet loss; and
    (b) a communication device coupled to the network element via the network, the communication device comprising:
        (i) a receiver to receive the loss notification signal from the network element where the communication device is at least one of the sources of the packet experiencing the non-congestion-based packet loss;

(ii) a packet marking module coupled to receive at least a portion of the loss notification signal and to mark the packet as potentially subject to non-congestion-based packet loss;

(iii) a verification module coupled to receive a packet loss indication and coupled to the packet marking module to determine whether the packet loss indication corresponds to any packet that have been marked; and (iv) a non-congestion-based loss recovery module coupled to the verification module to perform packet loss recovery without requiring reduction of a congestion window for the packets that are both associated with the packet loss indication and have been marked.

31. The system as in claim 30, wherein the network element further comprises an embedding module to embed packet header data into the loss notification signal from packets experiencing non-congestion-based packet loss.

32. The system as in claim 31, wherein the communication device comprises an extraction module to extract a next header from the embedded packet header data to identify a protocol layer to be notified of the non-congestion-based packet loss.

33. The system as in claim 30, wherein the communication device further comprises a congestion-based loss recovery module coupled to the verification module to perform a second packet loss recovery that includes a reduction of the congestion window for the packets that are associated with the packet loss indication and that have not been marked.

* * * * *